(12) United States Patent
Otero et al.

(10) Patent No.: US 8,367,007 B2
(45) Date of Patent: Feb. 5, 2013

(54) FEEDBACK STABILIZED OZONE GENERATOR CIRCUIT

(76) Inventors: Edward R. Otero, Palm Springs, CA (US); Peter K. C. Yeh, Chung Li (TW)

(*) Notice: Subject to any disclaimer, the term of this patent is extended or adjusted under 35 U.S.C. 154(b) by 362 days.

(21) Appl. No.: 12/657,170

(22) Filed: Jan. 15, 2010

(65) Prior Publication Data

US 2011/0027139 A1 Feb. 3, 2011

Related U.S. Application Data

(60) Provisional application No. 61/273,147, filed on Jul. 31, 2009.

(51) Int. Cl.
*B01J 19/08* (2006.01)

(52) U.S. Cl. .............................. 422/186.15; 422/186.07

(58) Field of Classification Search ............. 422/186.15, 422/186.07

See application file for complete search history.

(56) References Cited

U.S. PATENT DOCUMENTS

| | | | |
|---|---|---|---|
| 4,619,763 A | 10/1986 | O'Brien | |
| 4,842,723 A | 6/1989 | Parks et al. | |
| 5,443,800 A | 8/1995 | Dunder | |
| 5,474,750 A | 12/1995 | Racca et al. | |
| 5,540,898 A | 7/1996 | Davidson | |
| 5,770,168 A | 6/1998 | Carlsten et al. | |
| 5,879,641 A * | 3/1999 | Conrad et al. | 422/186.07 |
| 6,723,233 B1 | 4/2004 | Barnes | |
| 7,060,180 B1 | 6/2006 | Barnes | |
| 2005/0199484 A1* | 9/2005 | Olstowski | 204/176 |

* cited by examiner

*Primary Examiner* — Kishor Mayekar
(74) *Attorney, Agent, or Firm* — I. Michael Bak-Boychuk

(57) ABSTRACT

A control circuit is connected to sense the impedance changes in a transformer driven ozone generating circuit cause by inadvertent immersion in water of the ozone generating field and to respond by reducing the strength of the ozone generating field as result thereof. To retain some ozone generating usefulness during the presence of mist or vapors in the ozone generating field the control circuit includes a series connected operational amplifier in the feedback loop that while operating in its linear range effects a proportional feedback response to reduce the ozone output. In this manner the usefulness of ozone generation is extended during highly active periods in a pool or spa.

7 Claims, 2 Drawing Sheets

FEEDBACK STABILIZED OZONE GENERATOR CIRCUIT

REFERENCE TO RELATED APPLICATIONS

This application obtains the benefit of the earlier filing date of U.S. Provisional Application Ser. No. 61/273,147 filed on Jul. 31, 2009.

BACKGROUND OF THE INVENTION

1. Field of the Invention

The present invention relates to ozone generators for pools and spas, and more particularly to a feedback arrangement responsive to the impedance changes of a resonant tank circuit for producing a coronal plasma field that generates ozone associated with the inadvertent presence of water within the gap between the coronal plates.

2. Description of the Prior Art

The use of the chemically reactive nature of ozone as a sanitizing mechanism for controlling unwanted microbial growth has been known in the past, with particular recent focus in the application thereof for sterilizing the water in a pool or a spa. Simply, as the cost and the cumulative environmental impact of chlorination increases the search for viable alternatives has commensurately also increased, with the current focus now particularly directed to ozone as a sterilization mechanism replacing or augmenting the use of chlorine and the generation thereof has matured.

While the highly reactive nature of ozone is now widely appreciated also are its inherent risks and, as a consequence, various ozone generator configurations have been proposed in the past that in one manner or another control and/or limit its local production rate, as exemplified by the teachings of U.S. Pat. No. 5,443,800 to Dunder and U.S. Pat. No. 5,540,898 to Davidson; that alter the oscillation rate of the driving circuit to a fixed ratio of its tank circuit resonance as in U.S. Pat. No. 5,770,168 to Carlsten et al.; and/or respond to the tank circuit impedance as in U.S. Pat. No. 5,474,750 to Racca et al. While suitable for the purposes intended each of the foregoing either shuts off all ozone generation (e.g., Racca et al.) or is limited in its control authority range to the normal fluctuations in the ambient background and therefore do not respond with any significant effect in those circumstances where the ozone generating electrodes are deployed above a water surface and on occasion are fully immersed. This immersed state is particularly probable in a highly used and agitated pool or spa when the sterilization benefits of ozone are desired, resulting in compromised sterilization right when the use is heavy and enhanced.

The efficacy of some ozone generation even once fully immersed has been known in the past, particularly where the electrode separation gaps are small, as exemplified in the teachings of U.S. Pat. No. 5,154,895 to Mooa, and others. Thus by proper design of the electrode geometry (and/or the materials thereof) the continued operation of the sterilization process can be carried on even in the most vigorous water conditions. In light of this expanded operating range of water content that can be accommodated within the electrode gap a commensurate expansion in the authority of any regulating feedback is extensively desired and it is one such am arrangement that is disclosed herein.

BRIEF SUMMARY OF THE INVENTION

Accordingly, it is the general purpose and object of the present invention to provide a control arrangement for the excitation circuit powering the electrodes of an ozone generator to maintain its operation over the full range of ambient conditions.

Other and further objects of the invention will become apparent upon the review and inspection of the teachings below in conjunction with the accompanying drawings and illustrations.

Briefly, these and other objects are accomplished within the present invention by connecting an ozone generating cell into an air flowing conveyance which at its exit injects the outlet air flow into the flow circulating the water filling the pool or spa. In a customary manner the generator cell includes a set of spaced electrodes between which the air flow is conveyed each respectively connected to one corresponding end of the high potential secondary winding of a transformer which, by these connections, acts as a resonant tank circuit that, however, varies in its response with the content of the matter within the electrode gap with these changes in the electrode gap impedance then modifying the coronal production.

At its primary side the transformer is provided with two separately connected primary windings, the first of which is connected to a Zener diode referenced power source controlled by a first operational amplifier circuit which collects at its negative input the output of a second operational amplifier tied at its input to the second primary winding. Of course, since both the first and the second primary winding are inductively coupled to the secondary winding each will respond to the impedance changes within the electrode gap and the inverted connection of the second operational amplifier thus provides a convenient feedback arrangement attenuating the effects of these changes.

Those skilled in the art will appreciate that the foregoing feedback arrangement takes benefit of the expanded operating range obtained by the use of an operational amplifier circuit which therefore allows a much broader range of operation that, by proper electrode design, can accommodate all sorts of activity levels in the spa or pool. Thus the limitations of a control arrangement obtained in a single element circuit, as in Racca, are avoided, insuring the continued operational efficacy of the sterilization process.

DESCRIPTION OF THE PREFERRED EMBODIMENT

Figure 1:
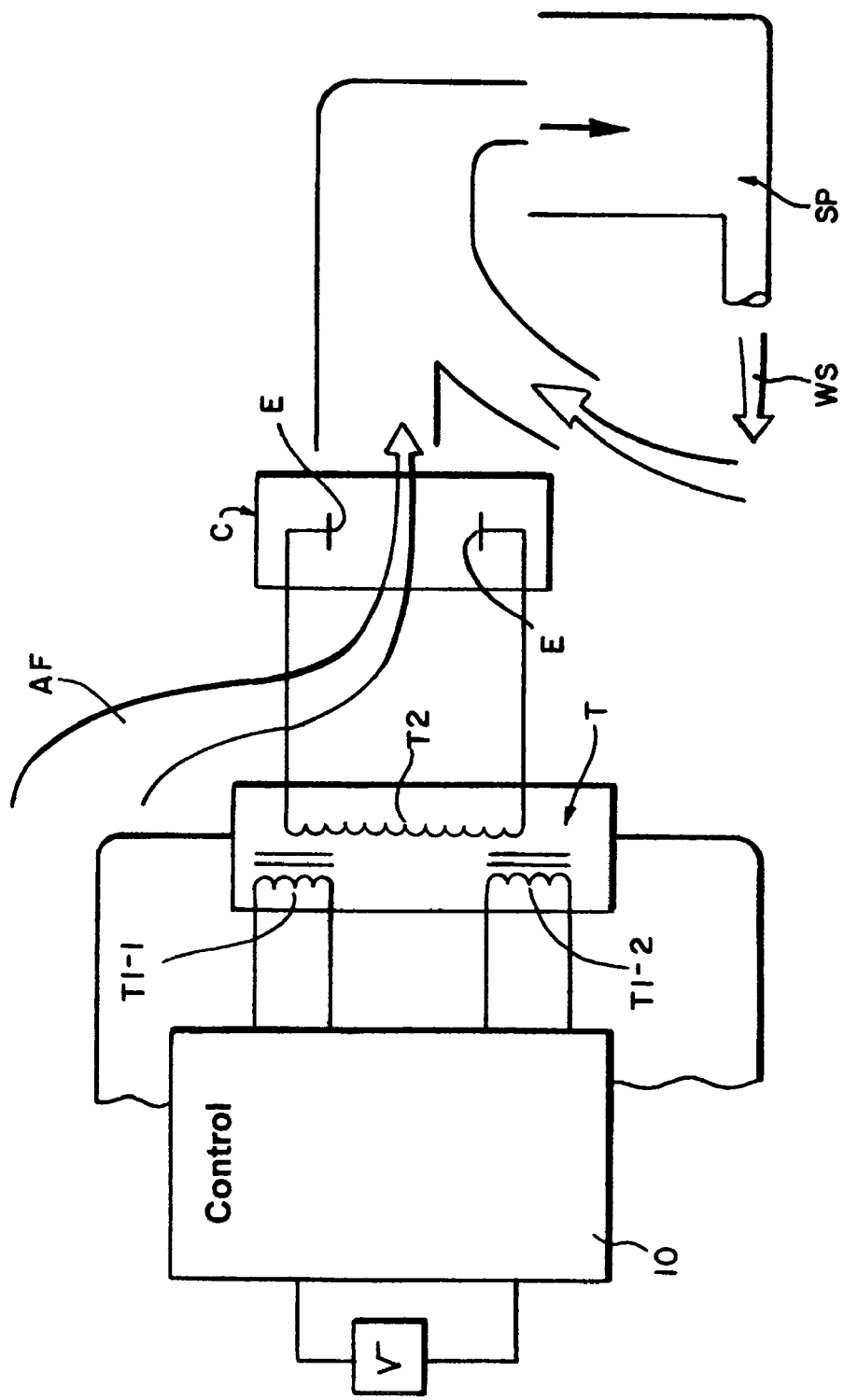
FIG. 1 is a diagrammatic illustration of the functional blocks of a transformer driven ozone generating system in accordance with the present invention providing a control feedback to the circuit driving a first separately connected transformer primary winding in response to the impedance sensed by a second separately connected primary winding.
Figure 2:
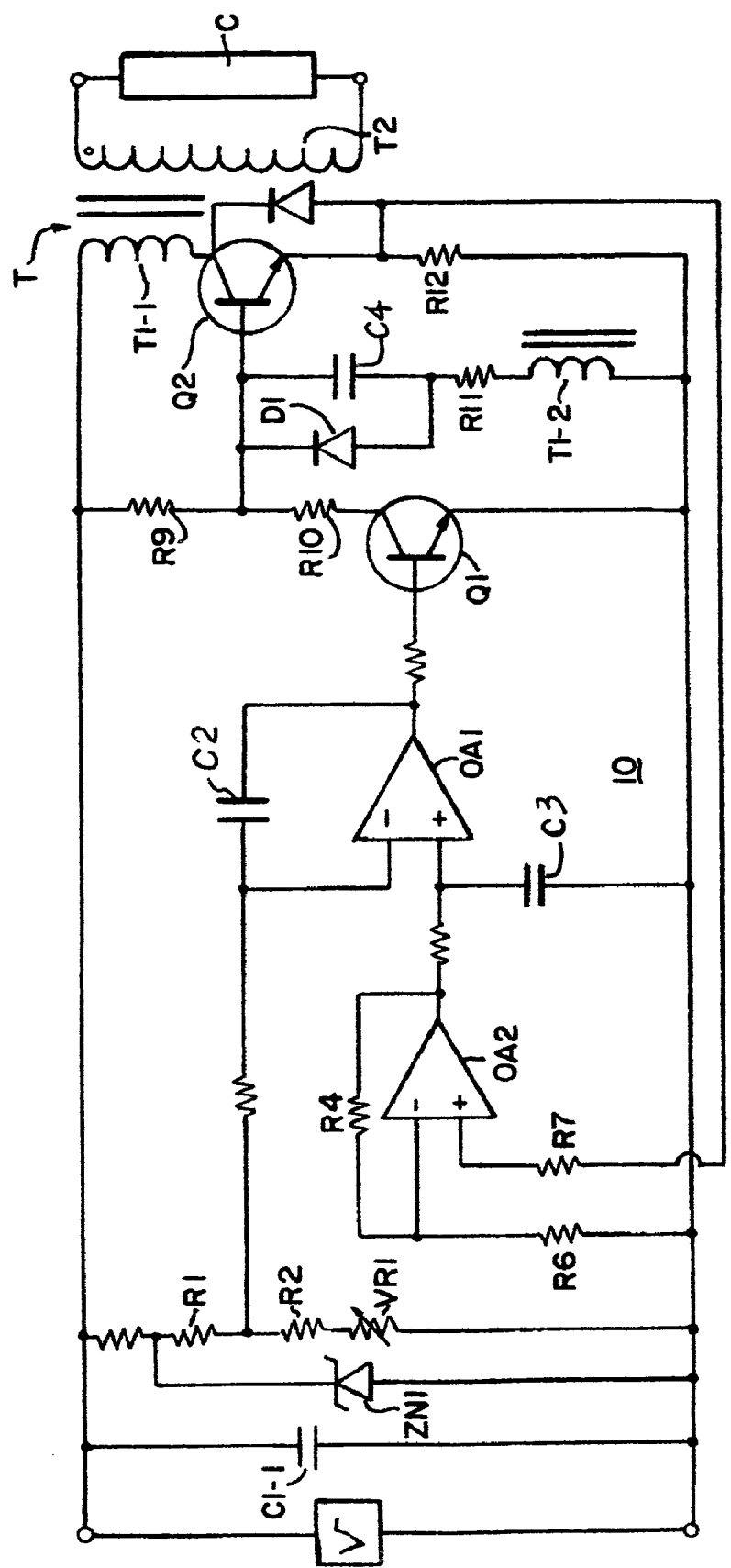
FIG. 2 is a circuit diagram illustrating the preferred circuit connections of a feedback arrangement in accordance with the present invention.

As shown in FIGS. 1 and 2 the inventive control circuit, generally designated by the numeral 10, connects the ends of a high voltage secondary winding T2 of a step-up transformer T to the electrodes E spaced across an ozone generating cell C through which a current of air AF is conveyed to mix with the water stream WS circulating through the pool or spa SP. In a manner known in the art the voltage across the secondary winding T2 is stepped up to a level sufficiently high to develop a coronal plasma discharge to produce ozone and, of course, such excitation level is best achieved at, or close to, the effective or equivalent circuit resonance that includes the effects of the dielectric separating the plates together with its various inductive and resistive components. In this configuration these impedance components will exhibit large changes in consequence to any back-flooding and/or whole or partial immersion of the electrode gap, greatly modifying the resonating nature of the circuit and therefore also its consequent levels of production of ozone.

To compensate for these impedance variations in a control arrangement that retains sufficient substantially linear control authority the transformer T is provided with two separately connected primary windings T1-1 and T1-2 with the winding T1-1 connected in the control circuit 10 between the collector of a transistor Q2 and the high voltage side of a source or input of electrical excitation V. Thus when the transformer secondary T2 reflects a drop in impedance into the primary winding T1-1 the collector voltage of transistor Q2 rises to the potential of the source V, as smoothed and filtered by a capacitor C1-1, and if transistor Q2 is driven to conduct by its base signal its emitter signal is also commensurately pulled up in accordance with the resistance of an emitter resistor R12 connected to the other side of the input source V.

The conduction of transistor Q2 is determined by a series connection including a diode D1, resistor R11 and the other primary winding T1-2 bridging the division point between two resistors R9 and R10 collected between the high side of the source V and the collector of yet another transistor Q1 controlled into conduction by the output of an operational amplifier OA1 connected as a comparator that compares the output of yet another operational amplifier OA2. Amplifier OA2, in turn, collects in subtraction the emitter signal (at resistor R12) of transistor Q2 with a division point across a Zener diode ZN1 formed by resistors R1, R2 and a variable resistor VR1, thus providing a linear expression (within the amplifier's saturation limits) of the impedance sensed by the feedback winding T1-1. At the same time the impedance drop of the second primary winding T1-2, as coupled across diode D1 and capacitor C4 to the base of transistor Q2, limits the conduction interval thereof to limit the power available for ozone generation with similar frequency responses obtained by capacitors C2 and C3 in the input and feedback of operational amplifier OA1.

In the foregoing form the benefits of operational amplifier OA2 connected for a linear operation by a feedback resistor R4 are obtained to expand the effective operating range within which ozone production will continue, thus retaining functional efficacy in the transitional states when substantial mist and vapor is generated and shutting off only when fully immersed. The continued functioning of an ozone cell is thus greatly enlarged to include periods of high activity and use of the pool or spa that is sterilized.

Obviously many modifications and variations of the instant invention can be effected without departing from the spirit of the teachings herein. It is therefore intended that the scope of the invention be determined solely by the claims appended hereto.

The invention claimed is:

1. A control arrangement useful to regulate a transformer enabled ozone generating circuit having a secondary winding thereof connected across an ozone generating gap, comprising:

first and second primary windings included in said transformer, each inductively coupled to said secondary winding;

switching means characterized by a conductive and a non-conductive state rendered operative in response to an enabling signal and connected between said first and second primary windings for effecting conduction through said first primary winding; and enabling means connected to said switching means and to said second primary winding for transmitting said enabling signal to said switching means in response to the comparison of the conduction output of said switching means and a predetermined electrical signal.

2. A control arrangement according to claim 1, further comprising:

a source of electrical excitation connected across said first primary winding, said switching means and said second primary winding.

3. A control arrangement according to claim 2, wherein:

said enabling means includes an operational amplifier connected to compare the conduction through said switching means against a preselected portion of the electrical signal from said source of electrical excitation.

4. A control circuit useful to regulate a coronal discharge cell for generating ozone within an electrode gap connected across a secondary winding, of a transformer, comprising:

first and second primary windings included in said transformer, each inductively coupled with said secondary winding;

switching means connected between said first and second primary windings characterized by a conductive and a non-conductive state rendered operative in response to an enabling signal for effecting conduction through said first primary winding; and a source of electrical excitation connected across said first primary winding, said switching means and said second primary winding; and enabling means connected to said switching means including a first operational amplifier defined by an input and an output operatively connected to compare the conduction through said switching means against a preselected portion of said electrical excitation connected to transmit said enabling signal to said switching means for enabling the operation of said switching means in response to the comparison of the conduction output of said switching means and a predetermined electrical signal.

5. A control circuit according to claim 4, wherein:

said enabling means includes a second operational amplifier defined by an input and an output connected to said input of said first operational amplifier and receiving at the input thereof said conduction output of said switching means.

6. A control circuit according to claim 5, wherein, said second operational amplifier includes a feedback connection.

7. A control circuit according to claim 4, wherein:

said discharge cell is exposed to immersion in water.

* * * * *